(12) United States Patent
Hosenpud et al.

(10) Patent No.: US 9,703,400 B2
(45) Date of Patent: Jul. 11, 2017

(54) VIRTUAL PLANE IN A STYLUS BASED STEREOSCOPIC DISPLAY SYSTEM

(71) Applicant: zSpace, Inc., Sunnyvale, CA (US)

(72) Inventors: Jonathan J. Hosenpud, San Francisco, CA (US); Arthur L. Berman, San Jose, CA (US); Clifford S. Champion, San Jose, CA (US); David A. Chavez, San Jose, CA (US); Francisco Lopez-Fresquet, Boulder Creek, CA (US); Robert D. Kalnins, San Jose, CA (US); Alexandre R. Lelievre, Hollywood, CA (US); Christopher W. Sherman, Leesburg, VA (US); Jerome C. Tu, Saratoga, CA (US); Murugappan R. Venkat, Los Altos, CA (US)

(73) Assignee: zSpace, Inc., Sunnyvale, CA (US)

( * ) Notice: Subject to any disclaimer, the term of this patent is extended or adjusted under 35 U.S.C. 154(b) by 0 days.

(21) Appl. No.: 14/880,007

(22) Filed: Oct. 9, 2015

(65) Prior Publication Data
US 2017/0102791 A1 Apr. 13, 2017

(51) Int. Cl.
*G06F 3/0354* (2013.01)
*G06F 3/0488* (2013.01)
*G06F 3/03* (2006.01)
*H04N 13/04* (2006.01)

(52) U.S. Cl.
CPC ...... *G06F 3/03545* (2013.01); *H04N 13/0422* (2013.01); *H04N 13/0468* (2013.01); *H04N 13/0497* (2013.01)

(58) Field of Classification Search
CPC ... G06F 3/03545; G06F 3/0488; G06F 3/0317
See application file for complete search history.

(56) References Cited

U.S. PATENT DOCUMENTS

| | | |
|---|---|---|
| 2007/0248261 A1 | 10/2007 | Zhou |
| 2007/0279435 A1 | 12/2007 | Ng |
| 2007/0279436 A1 | 12/2007 | Ng |
| 2011/0107270 A1* | 5/2011 | Wang .................. G06F 19/3437 715/850 |

FOREIGN PATENT DOCUMENTS

WO     2006058343 A1    6/2006

* cited by examiner

*Primary Examiner* — Charles Hicks
(74) *Attorney, Agent, or Firm* — Meyertons Hood Kivlin Kowert & Goetzel, P.C.; Jeffrey C. Hood; Bradley M. Parro

(57) ABSTRACT

Virtual plane and use in a stylus based three dimensional (3D) stereoscopic display system. A virtual plane may be displayed in a virtual 3D space on a display of the 3D stereoscopic display system. The virtual plane may extend from a stylus of the 3D stereoscopic display system. Content may be generated in response to a geometric relationship of the virtual plane with at least one virtual object in the virtual 3D space. The generated content may indicate one or more attributes of the at least one virtual object. The content may be presented via the 3D stereoscopic display system.

30 Claims, 9 Drawing Sheets

VIRTUAL PLANE IN A STYLUS BASED STEREOSCOPIC DISPLAY SYSTEM

TECHNICAL FIELD

This disclosure relates to the field of digital display and more particularly to configurations and applications of a virtual plane graphical surface used in association with a stylus based stereoscopic display system.

DESCRIPTION OF THE RELATED ART

Three dimensional (3D) displays (actually, simulated 3D, e.g., via stereoscopic display (SD) techniques) are increasingly utilized for a variety of applications, including, for example, remote viewing, videoconferencing, video collaboration, and so forth.

FIG. 1 illustrates a modern display chain, according to typical prior art embodiments, which includes the following components:

1. GPU—Graphics Processing Unit. This component resides on a personal computer, workstation, or functional equivalent, and outputs video levels for each color or channel of a supported color model, e.g., for each of three colors, typically Red (R), Green (G), and Blue (B), for each pixel on the display. Each of these numbers is typically an 8 bit number, with a range of 0 to 255, although other ranges are possible.

2. Scaler—This component takes as input the video levels (e.g., for R, G, and B) for each pixel output from the GPU, and processes them in various ways, before outputting (usually) modified video levels for RGB, usually in the same 8-bit range of 0-255. This component may also scale an image from the input resolution to a different, rendered resolution supported by the display.

3. Panel—This component is the display itself, typically a liquid crystal display (LCD), though other displays are possible, and takes as input the video levels (e.g., for R, G and B) output from the scaler for each pixel, and converts the video levels to voltages, which are then delivered to each pixel on the display. The panel itself may modify the video levels before converting them to voltages.

The video chain generally modifies the video levels in two ways, specifically gamma correction and overdrive. Note that the functionality described above is typically implemented in the scaler, but is sometimes implemented at least partially in other devices or elements of the video chain, e.g., in the GPU or display device (panel).

Time Sequential Stereo Displays

Unlike a normal (i.e., monoscopic) display, in a stereo display, there are two images for each video frame: right and left. The right image must be delivered to only an observer's right eye, and the left image must be delivered to only the observer's left eye. In a time sequential stereo display, this separation of right and left images is performed in time, i.e., the left and right images are presented sequentially, and thus, contains some time-dependent element which separates these two images. There are two common architectures for stereo displays.

The first architecture uses a device called a polarization switch (PS), which may be a distinct (i.e., separate) or integrated LC device or other technology switch and which is placed in front of the LCD panel (or any other type of imaging panel, such as an OLED (organic light emitting diode) panel, a plasma display, etc.) or any other pixelated panel display used in a time-sequential stereo imaging system. Specifically, the PS switch may be placed between the display panel and the viewer, as shown in FIG. 2. The purpose of the PS is to switch the light transmitted from the display panel between two orthogonal polarization states. For example, one of these states may be horizontally linearly polarized light (i.e., the light may be in a horizontal linear polarization state), and the other may be vertically linearly polarized light (i.e., the light may be in a vertical linear polarization state); however, other options are possible (e.g., left and right circular polarization states, etc.). The key feature that allows the PS to deliver the correct image to the correct eye of the viewer (i.e., the left image to the left eye and the right image to the right eye) is that the two polarization states are orthogonal to each other.

This architecture allows achievement of the stereo effect shown in prior art FIG. 3. As may be seen, the top portion of the figure shows the (display) panel switching between a left image and a right image. Synchronous with the panel switching, the PS is switching the light being transmitted between a left state and a right state, as shown. These two states emit two corresponding orthogonal polarization states, as explained above. As FIG. 3 further shows, the system includes stereoscopic eyewear that is designed such that the left lens will only pass the left state polarization and the right lens will only pass the right state polarization. In this way, separation of the right and left images is achieved.

The second conventional architecture uses stereoscopic shutter glasses, which replace (or integrate the functionality of) the PS and eyewear. In such systems, each eye is covered by an optical shutter, which can be either open or closed. Each of these shutters is cycled between opened and closed synchronously with the display panel in such a way that when the left image is shown on the display, only the left eye shutter is open, and when the right image is shown on the display, only the right eye shutter is open. In this manner, the left and right views are alternatingly presented to the user's left and right eye, respectively. The alternate presentation of left and right views to the user's left and right eyes creates the perception of visual depth, as shown in FIG. 4. Virtual objects may be displayed in this created 3D space, which exists both above the 3D stereoscopic display panel (i.e., negative space) and below the stereoscopic display panel (i.e., positive space).

Interacting with Virtual Objects in a Three Dimensional Virtual Space

In a conventional stereoscopic display system, a stylus, as shown in FIG. 5, may be used as an input device. The stylus may be used to indicate virtual objects in a 3D virtual space. This indication may be accomplished by a user moving the stylus within a specified proximity to the virtual object in the 3D virtual space, or by use of a virtual laser beam that may extend from the tip of the stylus in the 3D virtual space. For example, as shown in FIG. 5, stylus 130 and virtual laser beam 502 may be used by a user to indicate a virtual object, e.g., for selecting, querying, etc. Once a virtual object has been indicated, the user may manipulate or otherwise interact with the virtual object, for example by moving the stylus and thereby causing the virtual object to move as well. What is needed, however, is a mechanism by which a user may more flexibly interact with a virtual object in a 3D virtual space.

SUMMARY

Various embodiments of a system and method for generating and using a virtual plane in a stylus based sterenoscopic display system are presented. The system may include one or more displays and at least one processor coupled to the one or more displays. The system may further include a stylus communicatively coupled to the at least one processor and a memory coupled to the at least one processor. The processor may be configured to perform or implement embodiments of the techniques disclosed herein. Additionally, a method implementing embodiments of the techniques may be implemented on a computer or stored as program instructions on a computer readable memory medium. The method may operate as follows.

In an exemplary embodiment, a virtual plane may be displayed in a virtual 3D space on a display of a 3D stereoscopic display system. The virtual plane may extend from a stylus held by a user. The virtual plane may be displayed in positive space (i.e., "below" the plane of the display), negative space (i.e., "above" the plane of the display), in line with the plane of the display, or any combination of the above. The user may manipulate the virtual plane by means of moving the stylus, by means of controls (e.g., one or more of any of a button, a slider, a scroll wheel, a scroll ball, a joystick, a touch surface (or a touch pad), or any combination thereof) located on the stylus, or by other means as discussed in greater detail below. The user may control the appearance of the virtual plane (e.g., the size, shape, location, orientation, and/or appearance), the virtual plane may appear according to a default configuration, or the configuration (and thus, appearance) may be automatically determined by the 3D stereoscopic display system based the position of the stylus.

The method may further include generating content in response to a geometric relationship of the virtual plane with at least one virtual object in the virtual 3D space. For example, content may be generated in response to a user moving the virtual plane proximate to a virtual object. In a further embodiment, content may be generated in response to the virtual plane intersecting the virtual object. The type and substance of the generated content may depend on the particular geometric relationship of the virtual plane to the virtual object, or alternatively the type and substance of the content may not change with a change in the geometric relationship.

The method may further include presenting the content, e.g., on the display or via other output device(s). The content may indicate one or more attributes of the at least one virtual object. The content may include sound, text (e.g., numerical, alphabetical, symbolical, etc.), video, images, haptics, or any combination of the above. The one or more attributes of the at least one virtual object may include any property of the virtual object, as discussed in greater detail below. In one embodiment, the content may include imagery presented on the virtual plane, where the imagery includes at least one of a thermal map of the virtual object, a virtual x-ray image of the virtual object, a contour of the virtual object, a plot of the virtual object, or a density map of the virtual object. This listing is meant to be illustrative, not exhaustive, and further embodiments are discussed in greater detail below.

BRIEF DESCRIPTION OF THE DRAWINGS

A better understanding of the present disclosure can be obtained when the following detailed description of the preferred embodiment is considered in conjunction with the following drawings, in which.

Figure 1:
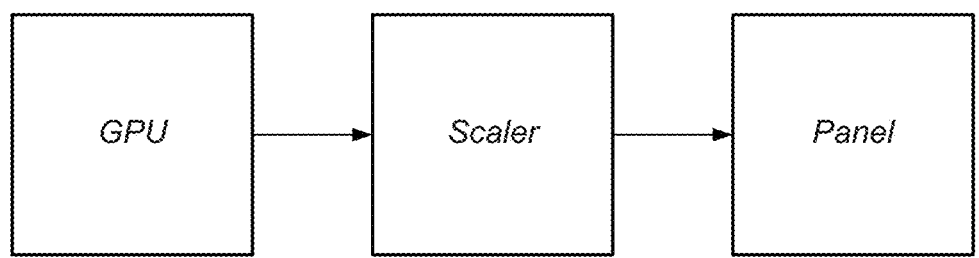
FIG. 1 illustrates a modern display chain, according to the prior art.
Figure 2:
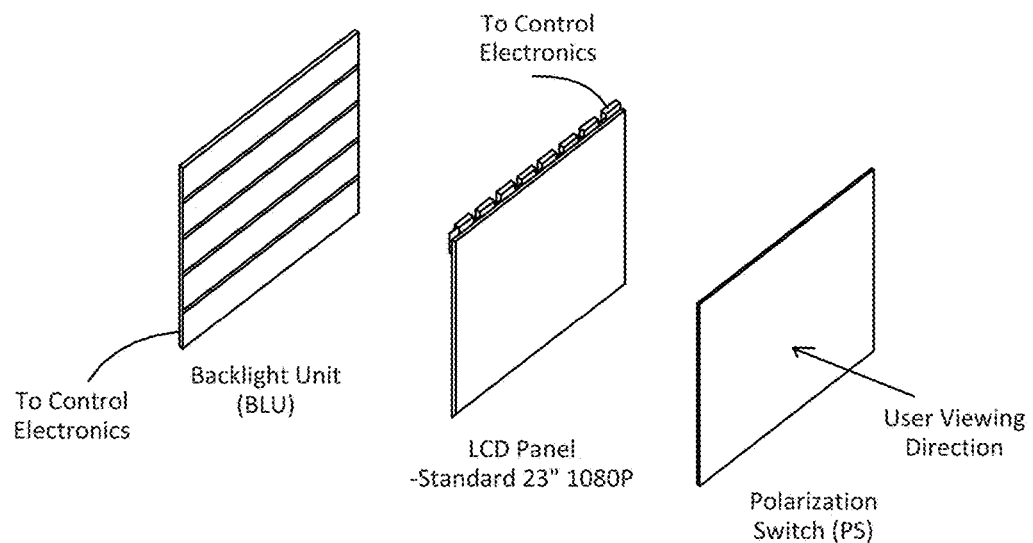
FIG. 2 illustrates an architecture that utilizes a polarization switch, according to the prior art.
Figure 3:
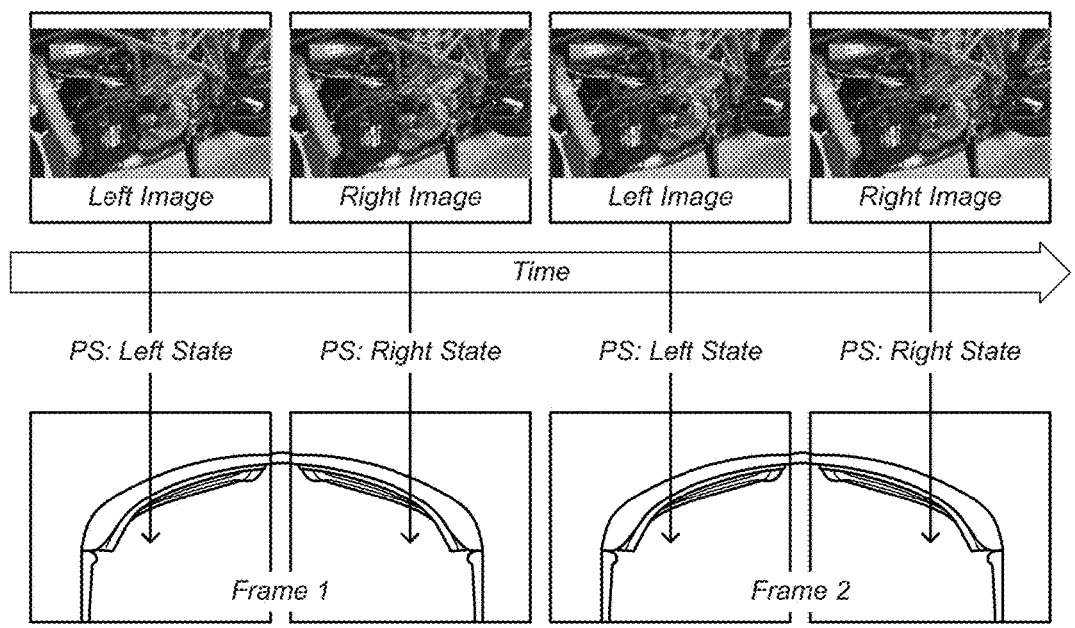
FIG. 3 illustrates a stereo effect (simulated 3D) using polarization switching between left and right views, according to the prior art.
Figure 4:
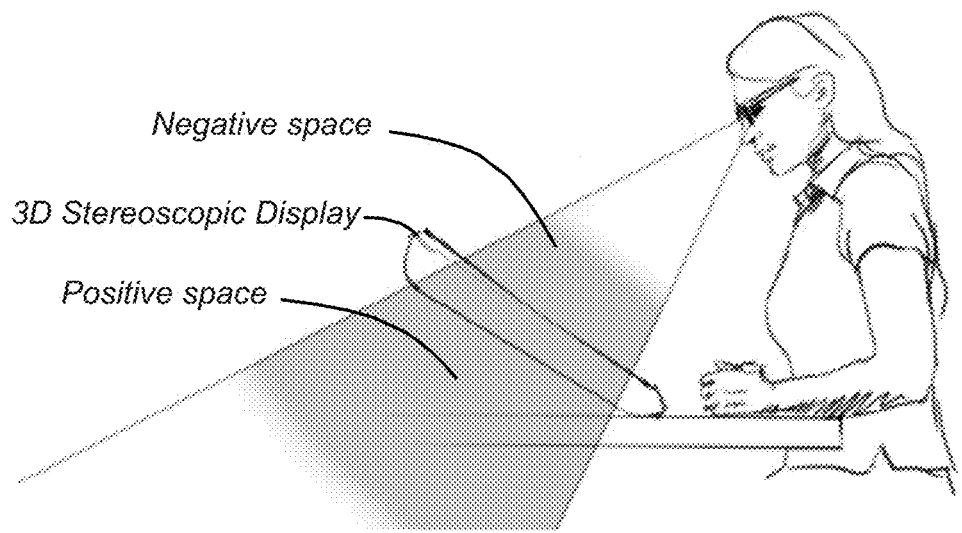
FIG. 4 illustrates a the positive and negative space of a 3D stereoscopic display, according to the prior art.
Figure 5:
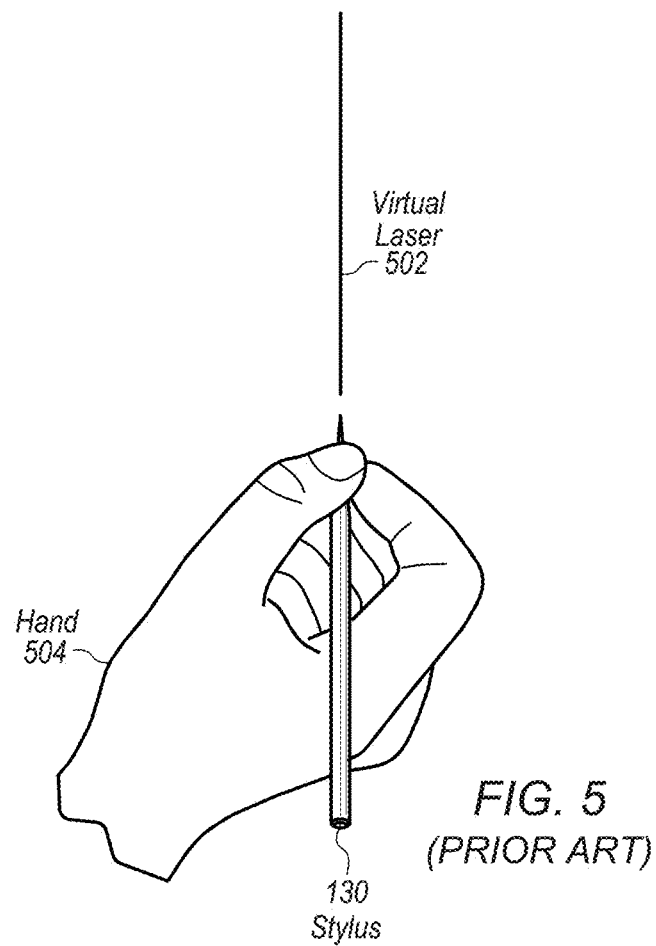
FIG. 5 illustrates a stylus and a virtual laser, according to the prior art.

While the disclosure is susceptible to various modifications and alternative forms, specific embodiments thereof are shown by way of example in the drawings and are herein described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION

Terms

The following is a glossary of terms used in the present application:

Memory Medium—any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, EEPROM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), smart phone, television system, grid computing system, tablet, or other device or combinations of devices. In general, the term "computer system" can be broadly defined to encompass any device (or combination of devices) having at least one processor that executes instructions from a memory medium.

Graphical Processing Unit—refers to a component that may reside on a personal computer, workstation, server, graphics server, or equivalent, and outputs video levels for each color or channel of a supported color model, e.g., for each of three colors, typically Red (R), Green (G), and Blue (B), for each pixel on the display. Each of these numbers is typically an 8 bit number, with a range of 0 to 255, although other ranges are possible.

Functional Unit (or Processing Element)—refers to various elements or combinations of elements configured to process instructions and/or data. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof Projection—refers the display of a 3D object, or content, on a two dimensional (2D) display. Thus, a projection may be described as the mathematical function applied to objects within a virtual 3D scene to determine the virtual position of the objects within a 3D space that may be defined by the size of the 3D stereoscopic display and the point of view of a user.

Viewpoint—This term has the full extent of its ordinary meaning in the field of computer graphics/cameras and specifies a location and/or orientation. For example, the term "viewpoint" may refer to a single point of view (e.g., for a single eye) or a pair of points of view (e.g., for a pair of eyes). Thus, viewpoint may refer to the view from a single eye, or may refer to the two points of view from a pair of eyes. A "single viewpoint" may specify that the viewpoint refers to only a single point of view and a "paired viewpoint" or "stereoscopic viewpoint" may specify that the viewpoint refers to two points of view (and not one). Where the viewpoint is that of a user, this viewpoint may be referred to as an eyepoint (see below) or "physical viewpoint". The term "virtual viewpoint" refers to a viewpoint from within a virtual representation or 3D scene. A viewpoint is synonymous with "point of view" (POV). (See definition of POV below.)

Eyepoint—the physical location (and/or orientation) of a single eye or a pair of eyes. A viewpoint above may correspond to the eyepoint of a person. For example, a person's eyepoint has a corresponding viewpoint.

Point of View (POV)—refers to or specifies a position and orientation. For example, a POV may be a viewpoint or eyepoint, generally of a user, but may also be a viewpoint of an optical device, such as a camera. The POV is generally a means to capture a relationship between two or more 6 degree of freedom objects. In a typical application of the present techniques, a user's pair of eyes or head (view) is positioned in any X, Y, Z position and/or pitch, yaw, roll orientation to a display device, e.g., a monitor screen, which may have its own position in any X, Y, Z position and/or pitch, yaw, roll orientation. In this example, the POV can be defined as the position/orientation of the user's view with respect to the positioning/orientation of the display device. The POV determination may be identified by a capture system. In a typical application of the present techniques, one or more tracking devices are attached to the display device, such that the controller knows what the tracking system tracks in the context of the display device, meaning the tracking system, being attached to the display device, is programmatically aware of the position/orientation of the display device, as well as any potential change to the position/orientation of the display device.

The tracking system (which may identify and track, among other things, the user's view) may identify the position/orientation of the user's view, and this information may then be correlated to the tracking system's identification of the viewing device's position/orientation (again, with respect to the display device).

Vertical Perspective—a perspective effect rendered from a viewpoint which is substantially perpendicular to the display surface. "Substantially perpendicular" refers to 90 degrees or variations thereof, such as 89 or 91 degrees, 85-95 degrees, or any variation which does not cause noticeable distortion of the rendered scene. A vertical perspective may be a central perspective, e.g., having a single (and central) vanishing point. As used herein, a vertical perspective may apply to a single image or a stereoscopic image. When used with respect to a stereoscopic image (e.g., presenting a stereoscopic image according to a vertical perspective), each image of the stereoscopic image may be presented according to the vertical perspective, but with differing single viewpoints.

Horizontal or Oblique Perspective—a perspective effect rendered from a viewpoint which is not perpendicular to the display surface. More particularly, the term "horizontal perspective" may typically refer to a perspective effect which is rendered using a substantially 45 degree angled render plane in reference to the corresponding viewpoint. The rendering may be intended for a display which may be positioned horizontally (e.g., parallel to a table surface or floor) in reference to a standing viewpoint. "Substantially 45 degrees" may refer to 45 degrees or variations thereof, such as 44 and 46 degrees, 40-50 degrees, or any variation which may cause minimal distortion of the rendered scene. As used herein, a horizontal perspective may apply to a single image or a stereoscopic image. When used with respect to a stereoscopic image (e.g., presenting a stereoscopic image according to a horizontal perspective), each image of the stereoscopic image may be presented according to the horizontal perspective, but with differing single viewpoints.

Another conception of the horizontal perspective as commonly used in embodiments of the present techniques relates to the projection of the intended rendered graphics to the viewing device. With the POV determined, a horizontal perspective engine may identify the correct graphics frustum in the 3D space, taking into account the position and orientation of the viewing device as defining the render plane of the frustum and the user's view in position and orientation to define a camera point of the frustum in relation to the render plane. The resultant projection is then rendered onto the viewing device as will be seen by the user.

Position—the location or coordinates of an object (either virtual or real). For example, position may include x, y, and z (i.e., location) coordinates within a defined space. The position may be relative or absolute, as desired. Position may also include yaw, pitch, and roll information, e.g., when defining the orientation of a viewpoint. In other words, position is defined broadly so as to encompass information regarding both location and orientation.

Stylus—a peripheral device or element such as a handheld device, handheld pen device, handheld pointing device, hand, finger, glove, or any object used to directly interact with rendered virtual objects as in a stereo rendered virtual projected objects.

Similar—as used herein in reference to geometrical shapes, refers to the geometrical term indicating that objects have the same shape, or that one object has the same shape as the mirror image of the other object. In other words, objects are considered similar if one object may be obtained from the other by uniformly scaling (enlarging or shrinking) the object. Additionally, the term similar, or similar objects, means that either object may be rescaled, repositioned, and reflected, so as to coincide with the other object. Thus, for example, if a first object is geometrically similar to a second object, i.e., has the same shape but possibly a different size, then either object may be uniformly scaled to obtain the geometrical size and shape of the other object. Thus, the first object may be uniformly scaled to obtain the second object or the second object may be uniformly scaled to obtain the first object. Note that this definition of similar only refers to the use of the word in the context of geometrical shapes and retains it ordinary meaning in other contexts (e.g., system A is similar to system B implies that system A resembles system B without being identical to system B).

Approximately—refers to a value that is correct or exact within some specified tolerance. For example, approximately may refer to a value that is within 1 to 10 percent of the exact (or desired) value. It should be noted, however, that the actual threshold value (or tolerance) may be application dependent. For example, in one embodiment, "approximately" may mean within 0.1% of some specified or desired value, while in various other embodiments, the threshold may be, for example, 2%, 3%, 5%, and so forth, as desired or as required by the particular application.

Proximate—near to; for example, proximate may mean within some specified distance, or within some specified fraction of a distance. Note that the actual threshold for being proximate is generally application dependent. Thus, in various applications, proximate may mean being within 1 mm, 1 inch, 1 foot, 1 meter, 1 mile, etc. of some reference point or object, or may refer to being within 1%, 2%, 5%, 10%, etc., of a reference distance from some reference point or object.

Substantially—refers to a term of approximation. Similar to the term "approximately," substantially is meant to refer to some tolerable range. Thus, if part A is substantially horizontal, then part A may be horizontal (90 degrees from vertical), or may be within some tolerable limit of horizontal. For example, in one application, a range of 89-91 degrees from vertical may be tolerable, whereas, in another application, a range of 85-95 degrees from vertical may be tolerable. Further, it may be that the tolerable limit is one-sided. Thus, using the example of "part A is substantially horizontal," it may be tolerable for Part A to be in a range of 60-90 degrees from vertical, but not greater than 90 degrees from vertical. Alternatively, it may be tolerable for Part A to be in a range of 90-120 degrees from vertical but not less than 90 degrees from vertical. Thus, the tolerable limit, and therefore, the approximation referenced by use of the term substantially may be as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually," where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Comprising—this term is open-ended, and means "including." As used in the appended claims, this term does not foreclose additional elements, structure, or steps. Consider a claim that recites: "A system comprising a display . . . "; such a claim does not foreclose the system from including additional components (e.g., a voltage source, a light source, etc.).

Configured To—various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

First, Second, etc.—these terms are used as labels for nouns that they precede, and do not imply any type of ordering (e.g., spatial, temporal, logical, etc.). For example, in a system having multiple tracking sensors (e.g., cameras), the terms "first" and "second" sensors may be used to refer to any two sensors. In other words, the "first" and "second" sensors are not limited to logical sensors 0 and 1.

Based On—this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

FIGS. 6-14 Exemplary System

Figure 6:
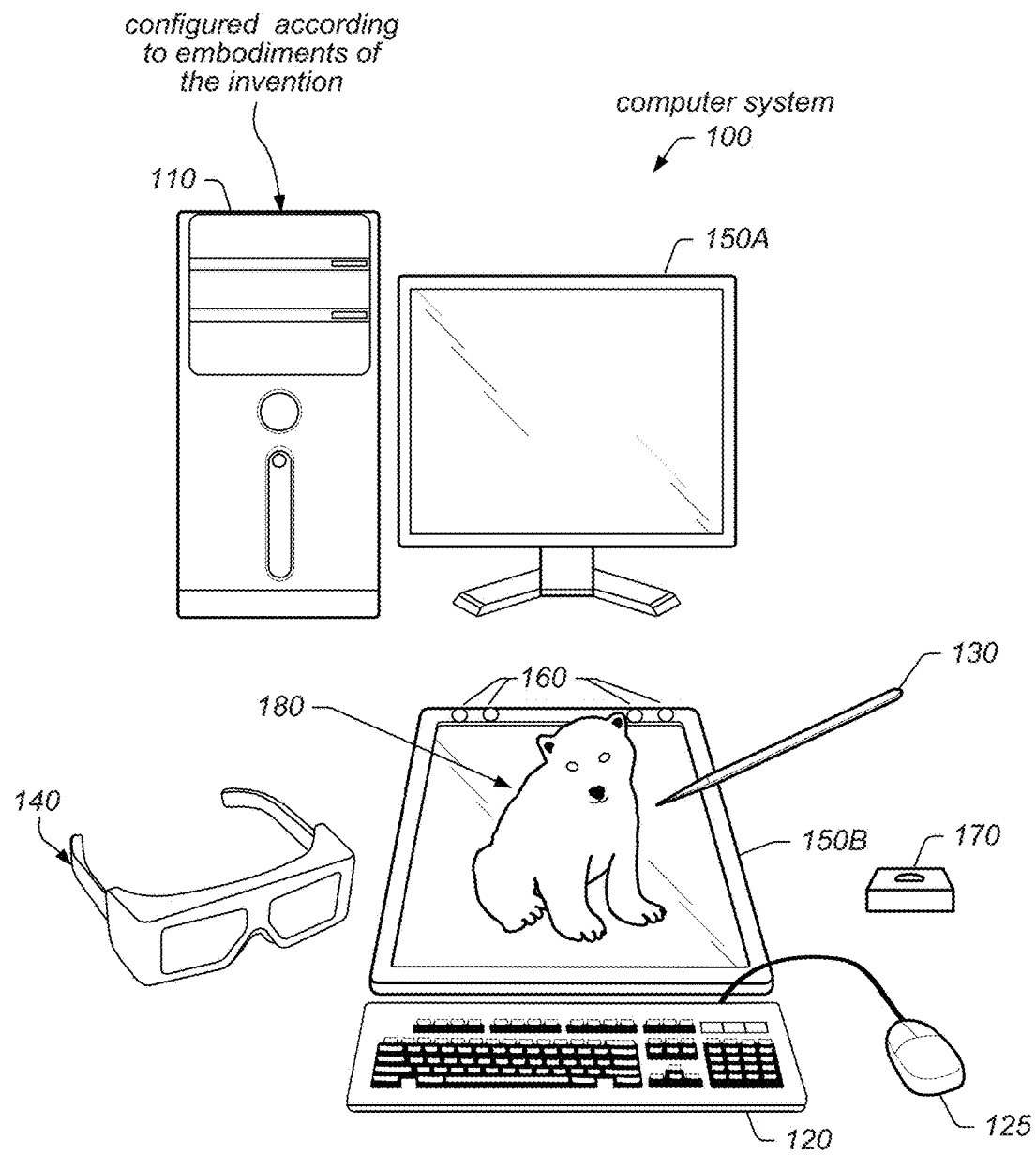
FIG. 6 illustrates a 3D stereoscopic display system configured according to an embodiment.

FIG. 6 illustrates an exemplary system configured to implement various embodiments of the techniques described below.

In the exemplary embodiment of FIG. 6, computer system 100 may include chassis 110, display 150A and display 150B (which may collectively be referred to as display 150 or "one or more displays" 150), keyboard 120, mouse 125, stylus 130, eyewear 140, at least two cameras 160, and caddy 170. Note that in some embodiments, two displays 150A and 150B may not be used; instead, for example, a single display 150 may be used. In various embodiments, at least one of the displays 150A and 150B may be a stereoscopic display. For example, in one embodiment, both of the displays 150A and 150B may be stereoscopic displays. Or, in other embodiments, the single display 150 may be a stereoscopic display. It is noted that a stereoscopic display may also be configured to display two-dimensional (2D) objects and may be configured to operate in a 2D mode.

The chassis 110 may include various computer components such as processors, at least one memory medium (e.g., RAM, ROM, hard drives, etc.), graphics circuitry, audio circuitry, and other circuitry for performing computer tasks, such as those described herein. The at least one memory medium may store one or more computer programs or software components according to various embodiments of the present invention. For example, the memory medium may store one or more graphics engines which are executable to perform some of the techniques described herein. In certain embodiments the graphics engine may be implemented on or by a functional unit or processing element. As used herein, and as noted in the Terms section above, the term functional unit or processing element refers to any of various elements or combinations of elements configured to process instructions and/or data. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

The memory medium (which may include two or more memory mediums) may also store data (and/or program instructions) (e.g., implementing or specifying a computer model) representing a virtual space, which may be used for projecting a 3D scene, such as scene 180, of the virtual space via the display(s) 150. Further, the memory medium may store software which is executable to perform three-dimensional spatial tracking (e.g., user view tracking, user control tracking, etc.), content processing, or other features, as described herein. For example, the computer system may include a tracking system that may track one or more of a user's head, a user's hand, or the stylus. Additionally, the memory medium may store operating system software, as well as other software for operation of the computer system. Various embodiments further include receiving or storing instructions and/or data implemented in accordance with the foregoing description upon a carrier medium.

As indicated above, the computer system 100 may be configured to display a three dimensional (3D) scene (e.g., via stereoscopic images), or 3D content, such as scene 180, using the display 150A and/or the display 150B. The computer system 100 may also be configured to display a "view" of the 3D scene using the display 150A, the display 150B, and/or another display, as described in more detail below. The "view" of the 3D scene, or content, may refer to a displayed a portion of the 3D scene from a viewpoint within the 3D scene. A viewpoint within the 3D scene may be referred to as a "virtual viewpoint." The view may be stereoscopic, e.g., may be displayed on a stereoscopic display. Alternatively, the view may be monoscopic (not stereoscopic), and may be displayed on either a monoscopic display or a stereoscopic display. Note that a monoscopic image or scene displayed on a stereoscopic display may appear the same as on a monoscopic display system.

It should be noted that the embodiment of FIG. 6 is exemplary only, and other numbers of displays are also envisioned. For example, the computer system 100 may include only a single display or more than two displays, or the displays may be arranged in different manners than shown. In this particular embodiment, the display 150A is configured as a vertical display (which may be perpendicular or approximately perpendicular to a user's line of sight) and the display 150B is configured as a horizontal display (which may be parallel (or approximately parallel) or oblique to a user's line of sight). The vertical display 150A may be used (e.g., via instructions sent by a graphics engine executing in the chassis 110) to provide images which are presented according to a vertical (or central) perspective and the display 150B may be used (e.g., via instructions sent by a graphics engine executing in the chassis 110) to provide images that are presented according to a horizontal perspective. Descriptions of horizontal and vertical perspectives are provided herein (see, e.g., the above Terms section). Additionally, while the displays 150 are shown as flat panel displays, in other embodiments, they may be any type of device or system which is capable of displaying images, e.g., projection systems. For example, display(s) 150 may be or include a CRT (cathode ray tube) monitor, a LCD (liquid crystal display) monitor, or a front projection or a back projection screen or surface with a plurality of projectors, among others. Display(s) 150 may include a light emitting diode (LED) backlight or other type of backlight.

Either or both of the displays 150A and 150B may present (display) stereoscopic images for viewing by the user. By presenting stereoscopic images, the display(s) 150 may present a 3D scene for the user. This 3D scene may be considered or referred to as an illusion or simulated 3D because the actual provided images are 2D, but the scene is conveyed in 3D via the user's interpretation of the provided images via stereoscopic effects. In order to properly view the stereoscopic images (one for each eye for each image frame), the user may wear eyewear 140. Eyewear 140 may be any of anaglyph glasses, polarized glasses, shutter glasses, lenticular glasses, etc., among others. In embodiments using anaglyph glasses, images for a first eye are presented according to a first color (and the corresponding lens has a corresponding color filter) and images for a second eye are projected according to a second color (and the corresponding lens has a corresponding color filter). With polarized glasses, images are presented for each eye using orthogonal polarizations, and each lens of the eyewear has the corresponding orthogonal polarization for receiving the corresponding image. With shutter glasses, each lens is synchronized with respect to left and right eye images provided by the display(s) 150, e.g., in alternating fashion. The display may provide both polarizations simultaneously or in an alternating manner (e.g., sequentially), as desired. Thus, the left eye may be allowed to only see left eye images during the left eye image display time and the right eye may be allowed to only see right eye images during the right eye image display time. With lenticular glasses, images form on cylindrical lens elements or a two dimensional array of lens elements. The stereoscopic image may be provided via optical methods, where left and right eye images are provided only to the corresponding eyes using optical means such as prisms, mirror(s), lens(es), and the like. Large convex or concave lenses can also be used to receive two separately projected images to the user.

In one embodiment, eyewear 140 may be used as a position input device to track the user view (e.g., eyepoint or point of view (POV)) of a user viewing a 3D scene presented by the system 100. For example, eyewear 140 may provide information (e.g., position information, which includes orientation information, etc.) that is usable to determine the position of the point of view of the user, e.g., via triangulation. In some embodiments, the position input device may use a light sensitive detection system, e.g., may include an infrared detection system, to detect the position of the viewer's head to allow the viewer freedom of head movement. Other embodiments of the input device(s) may use the triangulation method of detecting the viewer point of view location, such as one or more sensors (e.g., two cameras, such as charge coupled-device (CCD) or complementary metal oxide semiconductor (CMOS) cameras) providing position data suitable for the head tracking. The input device(s), such as a stylus, keyboard, mouse, trackball, joystick, or the like, or combinations thereof, may be manually operated by the viewer to specify or indicate the correct display of the horizontal perspective display images. However, any method for tracking the position of the user's head or point of view may be used as desired. Accordingly, the 3D scene may be rendered from the perspective (or point of view) of the user such that the user may view the 3D scene with minimal distortions (e.g., since it is based on the point of view of the user). Thus, the 3D scene may be particularly rendered for the point of view of the user, using the position input device.

The relationships among the position of the display(s) 150 and the point of view of the user may be used to map a portion of the virtual space to the physical space of the system 100. In essence, the physical space and components used may be mapped to the virtual model in order to accurately render a 3D scene of the virtual space.

One or more of the user input devices (e.g., the keyboard 120, the mouse 125, the stylus 130, pointing device, user control device, user hand/fingers, etc.) may be used to interact with the presented 3D scene. For example, the user input device 130 (shown as a stylus) or simply the user's hands may be used to directly interact with virtual objects of the 3D scene (via the viewed projected objects). Such direct interaction may be possible with negative space portions of the 3D scene. Thus, at least a portion of the 3D scene may be presented in this negative space, which is in front of or otherwise outside of the at least one display, via stereoscopic rendering (of the 3D scene). In some embodiments, at least a portion of the 3D scene may appear as a hologram-like image above the surface of the display 150. For example, when the horizontal display 150B is used, the 3D scene may be seen as hovering above the horizontal display. It should be noted, however, that a portion of the 3D scene may also be presented as appearing behind the display surface, which is in positive space Thus, negative space refers to a space which the user is able to freely move in and interact with (e.g., where the user is able to place his hands (or more generally, user input device 130) in the space), as opposed to a space the user cannot freely move in and interact with (e.g., where the user is not able to place his hands (or a user input device 130) in the space, such as below the display surface). Thus, negative space may be considered to be a "hands-on volume" as opposed to an "inner-volume" (i.e., positive space), which may be under the surface of the display(s), and thus not accessible. Thus, the user may interact with virtual objects in the negative space because they are proximate to the user's own physical space. Said another way, the positive space is located behind (or under) the viewing surface, and so presented objects appear to be located inside (or on the back side of) the physical viewing device. Thus, objects of the 3D scene presented within the positive space do not share the same physical space with the user and the objects therefore cannot be directly and physically manipulated by hands or physically intersected by hand-held tools such as stylus 130. Rather, they may be manipulated indirectly, e.g., via a computer mouse, a joystick, virtual representations of hands, handheld tools, or a stylus, or by projections from the stylus (e.g., a virtual laser or a virtual plane).

In some embodiments, system 100 may include one or more sensors 160. The one or more sensors 160 may be included in a tracking system. FIG. 6 illustrates an embodiment using four cameras 160. For instance, two of the four cameras 160 may be used to sense a user view (e.g., point of view) and the other two cameras 160 may be used to sense a user input device (e.g., pointing device, stylus, hand, glove, etc.). Alternatively, fewer than four sensors may be used (e.g., two sensors), wherein each sensor may track both the user (e.g., the user's head and/or the user's point of view) and the user input device. Sensors 160 may be used to image a user of system 100, track a user's movement, or track a user's head or eyes, among other contemplated functions. In one embodiment, cameras 160 may track a position and/or an orientation of stylus 130. The information regarding the position (including the orientation) of the stylus 130 provided by the one or more sensors 160 may be used in conjunction with other positional information of the system (e.g., an accelerometer and/or gyroscope within the stylus itself) to perform more precise 3D tracking of the stylus 130. The one or more sensors 160 may be spatially separated from one another and placed in a position to view a volume that encompasses where a user will view stereo imagery. Sensors 160 may also be far enough apart from each other to provide for a separation of view for a true three-axis triangulation determination. System 100 may also include a caddy 170 to store stylus 130. Caddy 170 may also be used to calibrate the orientation of the stylus to a known roll, pitch, and yaw, and so may be in a fixed position relative to cameras 160.

In one embodiment, the system 100 may be configured to couple to a network, such as a wide area network, via an input. The input may be configured to receive data (e.g., image data, video data, audio data, etc.) over the network from a system similar to system 100. In other embodiments, a tracking system may include cameras 160. Cameras 160 may be configured to provide visual information regarding a user (e.g., such that a POV, e.g., the position (including the orientation), of the user may be determined or such that a position of the user's hand may be determined). However, it should be noted that any type of various tracking techniques or devices may be used as desired. Note that as used herein, POV of a user refers to the perspective or POV from which a user optically views an object or image, i.e., a user's visual POV, and thus is defined with respect to the display device of the system. In some embodiments, the POV may be a 6 degree of freedom (6DOF) POV, e.g., three location coordinates and three orientation coordinates, although any POV may be used as desired, e.g., three location coordinates and two or three orientation coordinates, and so forth. As noted above, position coordinates may include both location and orientation coordinates.

Note that in some embodiments, the tracking system may rely at least in part on the components of chassis 110 to determine a position or a POV, e.g., via execution of one more programs by or on a processor or functional unit of chassis 110, although in other embodiments the tracking system may operate independently, e.g., may have its own processor or functional unit.

In certain embodiments, the system may include components implementing a perspective based image capture system, for capturing images of a target object at a location remote from the system. For example, the perspective based image capture system may include an input configured to couple to a network for receiving information regarding a point of view (POV) from a tracking system at a remote location. The information regarding the POV may indicate a position of a remote user. The perspective based image capture system may further include another image capture system for capturing images of a target object. More specifically, the image capture system may be configured to capture one or more images from a first perspective based on the information regarding the POV received by the input.

The user may be able to specify or otherwise manipulate a virtual viewpoint within the 3D scene presented by the display(s) 150. A view of the 3D scene may be presented based on the virtual viewpoint, either by one or more of the display(s) 150 or another display, as desired. This view of the 3D scene may be stereoscopic or monoscopic, as desired.

A 3D scene generator (e.g., content processing system) stored and executed in the chassis 110 may be configured to dynamically change the displayed images provided by the display(s) 150. More particularly, the 3D scene generator may update the displayed 3D scene based on changes in the user view, user control (e.g., manipulations via the stylus), etc. Such changes may be performed dynamically at run-time, and may be performed in real time. The 3D scene generator may also keep track of peripheral devices (e.g., stylus 130 or eyewear 140) to ensure synchronization between the peripheral device and the displayed image. The system may further include a calibration unit, procedure, and/or fiducial markers to ensure proper mapping of the peripheral device to the display images and proper mapping between the projected images and the virtual images stored in the memory of the chassis 110.

Thus, the system 100 may present a 3D scene with which the user may interact in real time. The system may include real-time electronic display(s) 150 that may present or convey perspective images in the open space, and a stylus 130 that may allow the user to interact with the 3D scene with hand controlled or hand-held tools. The system 100 may also include means to manipulate the displayed image in various ways, such as magnification, zoom, rotation, or movement, or even to display a new image. However, as noted above, in some embodiments, the system may facilitate such manipulations via the user's hands, e.g., without hand-held tools.

Further, while the system 100 is shown as including horizontal display 150B because it simulates the user's visual experience with the horizontal ground, other viewing surfaces may offer similar 3D illusion experiences. For example, the 3D scene may appear to be hanging from a ceiling by projecting the horizontal perspective images onto a ceiling surface, or may appear to be floating from a wall by projecting horizontal perspective images onto a vertical wall surface. More generally, any other variations in display orientation and perspective (or any other configuration of the system 100) may be used as desired.

Figure 7:
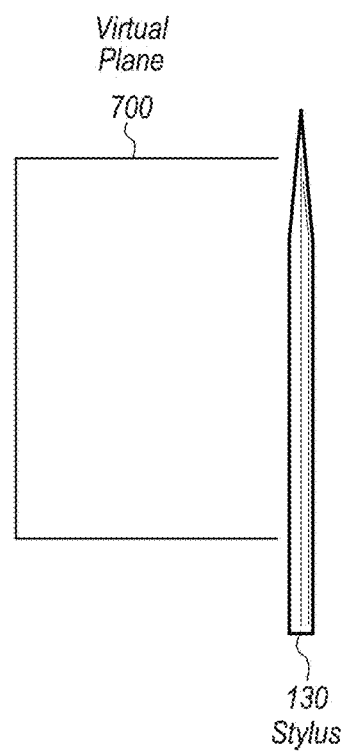
FIG. 7 illustrates a virtual plane according to an embodiment.
Figure 8:
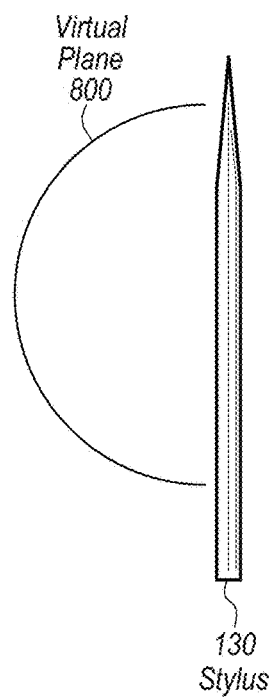
FIG. 8 illustrates a virtual plane according to an embodiment.
Figures 9A, 9B:
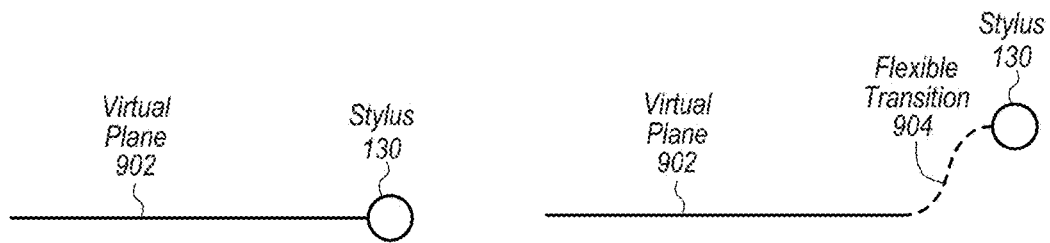
FIG. 9A illustrates a side view of a virtual plane according to an embodiment.
FIG. 9B illustrates a side view of a virtual plane with a flexible transition according to an embodiment.
Figure 9C:
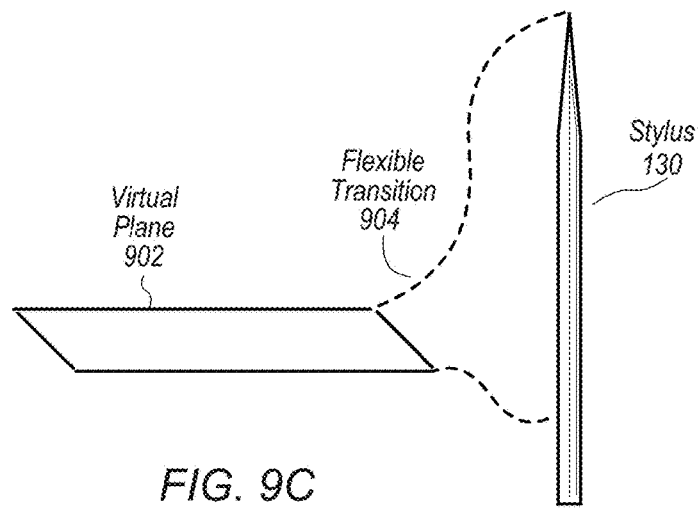
FIG. 9C illustrates an angled view of a virtual plane with a flexible transition according to an embodiment.

As shown in FIG. 7, a user of system 100 may invoke a virtual plane (also referred to herein as a "cutting" plane or an "interrogation" plane) in order to interact with the 3D scene. Virtual plane 700 may extend from stylus 130 (into the 3D scene) and may be displayed in accordance with a configuration, where the configuration specifies one or more properties of the virtual plane (e.g., a size of the virtual plane, a shape of the virtual plane, a position of the virtual plane relative to the display, a position of the virtual plane relative to the stylus, an appearance of the virtual plane, etc.). In an embodiment, the virtual plane may extend from the stylus such that a user sees the physical stylus and also the virtual plane (e.g., the physical stylus is augmented with the virtual plane). In an alternative embodiment, the virtual plane may extend from the stylus such that a user sees a virtual representation of the stylus from which the virtual plane extends into 3D space (e.g., the user perceives a virtual representation of the stylus in place of the physical stylus held by the user). Note that both embodiments are contemplated when the present disclosure states that the virtual plane extends from the stylus. The configuration may specify the extent to which the virtual plane extends from the stylus. For example, for a rectangular virtual plane, the configuration may specify a width and a height. For a semicircular virtual plane, as shown in FIG. 8, the configuration may specify a radius. Alternatively, the virtual plane may extend infinitely (or in an unbounded manner) in one or more directions. The configuration may further specify the shape of the virtual plane. For example, the virtual plane may have a shape that is rectangular, semicircular (as shown in FIG. 8), circular, oval, elliptical, triangular, amorphous or irregular, or any other geometric shape, as desired. The configuration may further specify the position (including both the location and the orientation) of the virtual plane relative to the one or more displays. That is, the virtual plane may initially be displayed relative to the one or more displays at a given location (e.g., a given distance above or below a display surface) and at a given orientation (e.g., parallel to, at a 45 degree angle to, at a 90 degree angle to, etc., the display surface). Alternatively, the position and orientation of the virtual plane may be relative to the stylus. That is, the virtual plane may initially be displayed relative to the stylus at a given location (e.g., extending from the long axis of the stylus away from the hand holding the stylus, beginning at the tip of the stylus) and at a given orientation (e.g., at a given angle according to a reference angle of the stylus). An example of a position of the virtual plane relative to the stylus is shown in FIG. 9A. The orientation of the virtual plane may further be perpendicular (or approximately perpendicular within a margin of error) to the viewing direction of the user. The configuration may further specify the appearance of the virtual plane. For example, the virtual plane may have varying degrees of opacity (e.g., opaque, translucent, transparent), may have various characteristics (e.g., striped, checkered, spotted, textured, patterned, etc.), and/or may appear in any color(s) (including, e.g., white, black, or without color (i.e., transparent)) or combination of colors.

The configuration of the virtual plane may be set to a default configuration. A user may be able to change the default configuration such that the virtual plane appears according to the (changed) default configuration once invoked. The user may subsequently change one or more aspects of the configuration, i.e., the configuration may further be user-specified, where the user can change any aspect of the configuration of the virtual plane once the plane has been invoked. Alternatively, the configuration may be automatically determined by the stereoscopic display system based on the context of the situation (e.g., based on the position of the stylus). For example, a user may invoke the virtual plane by changing the position of the stylus, e.g., by reorienting the stylus such that the long axis of the stylus is parallel to the display screen. If the virtual plane is invoked in this manner, the virtual plane may appear according to a configuration specified for this purpose. In other words, the configuration and accordant appearance of the virtual plane may be based on the context or manner in which the virtual plane is invoked. In some embodiments, the configuration may further be automatically determined based on the position of the stylus relative to one or more virtual objects presented by the display(s). For example, if a user changes the position (e.g., location or orientation) of the stylus when the stylus is proximate to a virtual object, the configuration of the virtual plane may automatically change accordingly. For example, if a user moves the stylus proximate to a large virtual object, the size of the virtual plane may increase to accommodate the object.

A user may invoke the virtual plane by changing the position of the stylus. For example, the user may reorient the long axis of the stylus to an orientation perpendicular to the plane of the display screen. Alternatively, the reorientation of the long axis of the stylus to any predefined orientation (e.g., a 45 degree angle, etc.) relative to the plane of the display screen may invoke the virtual plane. The user may set the predefined orientation as a configuration setting such that reorientation of the long axis of the stylus to the predefined orientation (or to an orientation approximating the predefined orientation within some acceptable margin of error) invokes the appearance of the virtual plane. Alternatively, the stereoscopic display system may automatically determine whether to invoke the display of the virtual plane based on the position of the stylus relative to one or more virtual objects in the 3D virtual space. For example, if a user moves the stylus to within a specified distance of the virtual object and/or to a specified orientation relative to the virtual object, the stereoscopic displays system may invoke display of the virtual plane. More generally, in some embodiments, the user may define the particular circumstances (i.e., the position(s) of the stylus relative to the display screen and/or any virtual object) that invoke the virtual plane. Alternatively, the virtual plane may be configured to automatically appear (e.g., according to a default configuration or according to a configuration automatically determined by the stereoscopic display system) upon the initial use of the system by the user. Furthermore, the stylus may include one or more controls, including, for example, one or more buttons and/or one or more sliders. The user may invoke the virtual plane by means of the one or more controls. For example, the virtual plane may appear when the user activates a button on the stylus.

A virtual plane that has been invoked may appear fully formed, or it may appear gradually. For example, the virtual plane may extend gradually from the stylus to a predetermined, automatically determined, or user-specified length. Alternatively, the virtual plane may gradually materialize (e.g., the virtual plane may gradually assume greater degrees of opacity, appear in sections that come together to form the plane, etc.), grow in size while retaining the final shape, or move into position from the periphery of the scene, field of view, or display. More generally, any type of temporal transition effect (i.e., occurring over time) may be used as desired for initial display of the virtual plane. Additionally, any of such transition effects may be used when the configuration of the virtual plane changes.

The virtual plane may exist in the 3D virtual space and may be attached to the stylus (in the 3D virtual space), as shown in FIGS. 9A and 9B. For example, virtual plane 902 may extend directly from stylus 130. Virtual plane 902 may further be attached to stylus 130 via a flexible transition or a flexible connection, such as flexible transition 904. Notably, although virtual plane 902 is depicted as parallel to the long axis of stylus 130 in FIG. 9B, this is not an exclusive relationship. For example, in the exemplary embodiment shown in FIG. 9C, virtual plane 902 may exist at any position (that is, at any orientation or location) relative to stylus 130, and may remain connected to stylus 130 via flexible transition 904 regardless of their respective positions. In this way, virtual plan 902 may exist or be moved to any position in positive or negative space and retain a connection to stylus 130 via flexible connection 904.

The flexible connection may be similar in appearance to the virtual plane (e.g., the flexible connection may have the same or substantially similar opacity and/or color as compared to the virtual plane). Alternatively, the flexible connection may be different in appearance from the virtual plane, and may appear according to any number of properties as discussed above with respect to the virtual plane (e.g., the flexible connection may range from transparent to opaque, and may have a certain color scheme, etc.). The appearance of the flexible connection may be a default appearance, a user-specified appearance, or may be automatically determined by the stereoscopic display system.

Figures 10A, 10B:
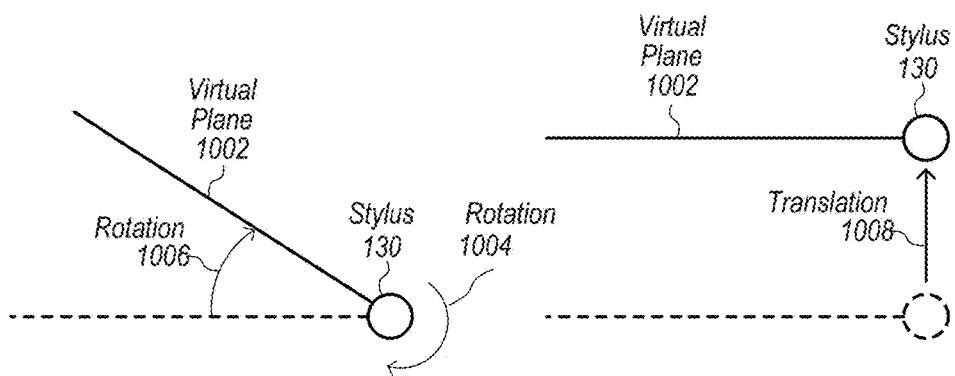
FIG. 10A illustrates a rotation of a virtual plane according to an embodiment.
FIG. 10B illustrates a translation of a virtual plane according to an embodiment.
Figure 11:
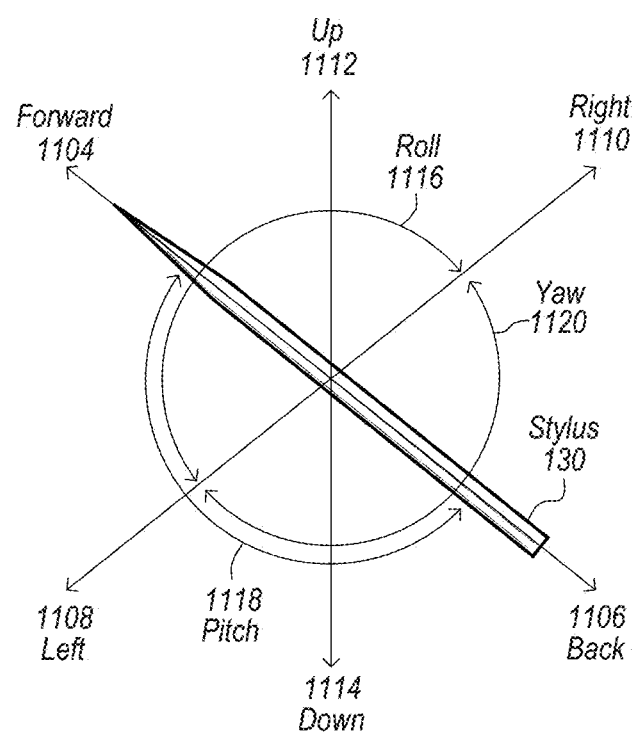
FIG. 11 illustrates the degrees of freedom of a stylus according to an embodiment.
Figure 12:
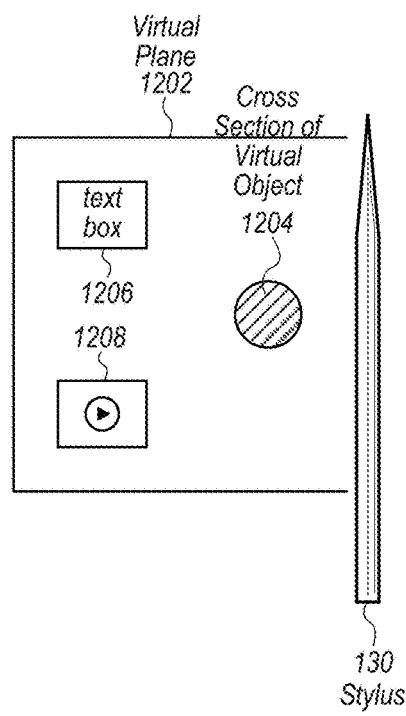
FIG. 12 illustrates generated content displayed on a virtual plane according to an embodiment.

The user may manipulate the virtual plane by means of the stylus. As shown in FIGS. 10A and 10B, a movement in the position of stylus 130 may invoke a corresponding movement in the position of the virtual plane 1002. For example, a user may rotate stylus 130 according to rotation 1004. This rotation of the stylus may result in a rotation of cutting plane 1002 according to rotation 1006. The rotation 1004 of stylus 130 may correspond to rotation 1006 by any relationship (e.g., a degree of rotation 1004 may equal a degree of rotation 1006, or, alternatively, a degree of rotation 1004 may correspond to a different amount of rotation 1006, which may be greater or lesser than a degree). Furthermore, a user may translate stylus 130 (i.e., change the location of stylus 130 from a first location to a second location) according to translation 1008, and this translation may result in a respective change in location of cutting plane 1002. The manners by which the cutting plane may be moved by means of the stylus are not limited to these two examples. Rather, stylus 130 may be free to move according to six degrees of freedom, as depicted in FIG. 11. That is, stylus 130 may move in any combination of the three linear spatial dimensions (i.e., forward/back, left/right, up/down) or in any combination of the three rotational spatial dimensions (i.e., pitch, roll, yaw). A movement in the stylus according to any of these dimensions may be reflected in a similar movement of the cutting plane (e.g., in equal or different proportions to the movement in the stylus), and the flexible transition may retain the connection between the stylus and the cutting plane, even when the cutting plane exists or is moved into positive space (i.e., the space "below" the plane of the display screen).

The user may further manipulate the virtual plane by means of one or more controls that may be located on the stylus. For example, the virtual plane may move in a predefined direction and at a predefined speed (i.e., at a predefined velocity) for the duration during which the user activates one of the controls (e.g., a button on the stylus). In some embodiments, the virtual plane may move at a velocity that is automatically determined based on other information, e.g., the extent to which the control is activated (i.e., a deeper or harder button depression or a further movement of a slider may invoke a larger speed), an orientation of the stylus (e.g., the virtual plane may move in the direction indicated by the tip of the stylus, in the direction opposite, in a direction orthogonal to an axis of the stylus, etc.), an orientation of the user's gaze, or a position of the stylus with respect to a virtual object (e.g., relatively close proximity to a virtual object may invoke a lesser speed of the virtual plane; or intersection of the virtual plane with the virtual object may induce the virtual plane to move according to a long axis of the virtual object, if present, at a relatively low speed, etc.). In various embodiments, the virtual plane may move at a constant speed, at a variable speed, at a constant angle relative to the plane of the display, or at a variable angle relative to the plane of the display.

In some embodiments, the virtual plane may be fixed in a specified position in the 3D virtual space. For example, after a user has moved the virtual plane into a desired position, the user may indicate or specify that the plane should be fixed in that position. The indication from the user may include a change in position of the stylus (e.g., a change of the orientation of the stylus to a preset orientation, or a specified movement or gesture of the stylus that serves as a command to fix the plane in position, etc.), a verbal command from the user, an automatic determination made by the stereoscopic display system (e.g., upon intersection of the virtual plane with a virtual object, etc.), a change in state of a stylus control, or by any other means of user input (e.g., via a keyboard, mouse, a virtual tool, e.g., selected from among multiple virtual tools displayed, e.g., in an array or palette).

The stereoscopic display system may further display a plurality of virtual planes. Each of the plurality of virtual planes may be individually controlled by the user, or alternatively the plurality of virtual planes, or a subset of the plurality, may be collectively controlled. Each additional plane may be invoked by the user by any of the various means discussed above, or each additional plane may be automatically displayed by the stereoscopic display system based on other information (including, for example, the presence of a plurality of virtual objects). In some embodiments, the user may step or cycle through the plurality of virtual planes, where the current selected plane is visually highlighted in some manner. The planes may be stepped through in any of various orders, e.g., in order of creation/invocation, in some spatial order, e.g., per a (user) specified axis or direction.

A user may further define a volume within the 3D space (e.g., by means of moving the virtual plane or by means of multiple virtual planes). In one embodiment, a user may define a space by moving a virtual plane by means of a stylus while activating a control on the stylus. For example, the volume may be defined by the initial position of the virtual plane and one or more subsequent positions of the virtual plane, where the user indicates the subsequent positions via a control on the stylus or other input device. Thus, the user may "extrude" a volume by moving the virtual plane some distance from the initial position, may define a convex hull by establishing successive bounding planes, and so forth. The user may then use this defined volume to interact with one or more virtual objects. For example, content may be generated based on a geometric relationship of the defined volume to one or more virtual objects (e.g., an attribute of a virtual object may be presented in response to the object existing within (wholly or partially) the defined volume, i.e., in response to the object intersecting the defined volume).

As noted above, in some embodiments, the stereoscopic display system may display an array of selectable virtual tools, including, for example, at least one virtual button, at least one virtual knob, at least one virtual keyboard, at least one virtual slider, at least one picklist, at least one color wheel, at least one character map, and/or at least one virtual dial. These selectable tools may be usable to interact with objects in the 3D space or with the virtual plane. For example, a user may control the appearance of one or more virtual objects by means of one or more of the virtual tools (e.g., a user may change the transparency of the object by means of a virtual knob). A user may use one or more of the tools to update the generated content, as described further below. These tools may be presented proximate to the stylus (e.g., extending from the stylus) or proximate to at least one virtual object, or may be presented in a specified region of the display. The tools may be selectable by means of a keyboard input from the user, selection via the user's hand, selection via the user's gaze (e.g., via intersection of a line of sight vector from the user's eye(s) with the tool, a control of the stylus, and/or an indication (e.g., a selection) by the stylus.

In some embodiments, the stereoscopic display system may generate content in response to a geometric relationship of the virtual plane with one or more virtual objects in the virtual 3D space. Geometric relationships that may induce the generation of content may include, for example, proximity of the virtual plane to or intersection of the virtual plane with at least one of one or more virtual objects. The geometric relationship may be determined based on a tracking system that identifies the location in the 3D space of the virtual plane with respect to the one or more virtual objects (e.g., the tracking system may track one or more of a user's head, a user's hand, or the stylus, wherein the tracking system is used to determine the geometric relationship of the virtual plane with at least one virtual object). For example, for a virtual object that is a virtual representation of a mountain, proximity to or intersection with the mountain may induce the generation of content related to the mountain (e.g., the display of the height of the mountain, a contour map of the mountain, the name of the mountain, the location of the mountain, historical facts regarding the mountain, atmospheric information regarding the mountain, a virtual map of the mountain's interior, etc.). The content may include a cross section of the virtual object. Following the above example, the content may include a cross section of the mountain. This cross section may update as the user moves the virtual plane with respect to the mountain. In another example, the virtual object may be a virtual representation of a human body. In this scenario, the virtual content may include a virtual x-ray image of the human body. If the virtual plane intersects the human body, the virtual content may include a cross section of the human body. Notably, the virtual content may include a still image, a video, audio information, haptic information, textual information, graphical information, and/or symbolic information, et cetera. As applied to the example of the human body, the virtual content may include, for example, a cross section of the human body that depicts, for example, the flow of blood through the body. More generally, the virtual content may indicate one or more attributes of the one or more virtual objects. The attributes may include general information related to the virtual object (e.g., the name of a mountain, the name of a particular organ in a human body, etc.) imagery of an aspect of the virtual object (e.g., a cross section, magnification, etc.), or one or more numeric values associated with the virtual object (e.g., the height of a mountain), among others.

Figure 13:
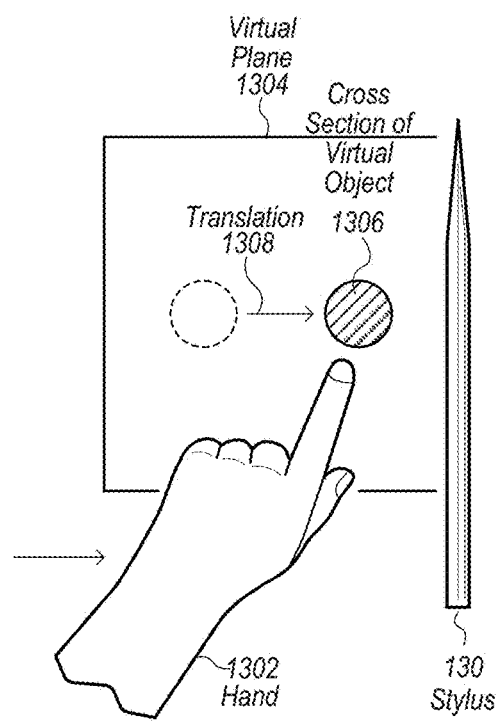
FIG. 13 illustrates manipulation of generated content on a virtual plane according to an embodiment.

The content may be displayed on the virtual plane. For example, turning now to FIG. 12, virtual plane 1202 is shown with various generated content that may be displayed thereon. One example of such generated content is a cross section of virtual object 1204 (e.g., a cross section of the virtual object defined by the virtual plane intersecting the virtual object). In an alternative embodiment, the displayed content may be a two dimensional projection of the virtual object onto the virtual plane. The generated content may include textual information related to one or more virtual objects, e.g. text describing an attribute of a virtual object, e.g., displayed in text box 1206, and/or video content, e.g. displayed in video window 1208. In various embodiments or applications, the generated content may include one or more of: a thermal map corresponding to one or more virtual objects, a virtual x-ray image of one or more virtual objects, a contour (or contour map) of one or more virtual objects or terrain, a cross section, a video, structural stresses, fluid flow direction, flux magnitude, a cross sectional force field, a vector field, a plot of information related to one or more virtual objects, and/or a density map of one or more virtual objects, among other forms of content. The generated content, (e.g., cross section of virtual object 1204) may be generated in response to the geometric relationship of virtual plane 1202 with the virtual object. One example of such a geometric relationship may be an intersection in the virtual 3D space of virtual plane 1202 with the virtual object. The generated content may be updated as a user moves virtual plane 1202 or as the virtual object moves through the 3D space (e.g., with respect to the virtual plane 1202 or in response to movement of the virtual plane 1202), e.g., as a user moves the virtual object through the 3D space, as depicted in FIG. 13. A user may manipulate the virtual object (e.g., translate the virtual object through the 3D space, such as via translation 1308) by any number of means, including by using the user's own hand (e.g., hand 1302). By virtue of moving the virtual object, the generated content may update in response to the new geometric relationship of the virtual plane with the virtual object.

The generated content may further change temporally. In other words, the generated content (e.g., cross section 1204) may update according to the nature or behavior of one or more objects in the 3D space over time. For example, if a virtual volcano exists in the 3D space, a user may interact with the virtual volcano by means of the virtual plane. One example of such an interaction may include a user prompting the generation of virtual content by means of a geometric relationship of the virtual plane with the virtual volcano (e.g., intersection of the virtual plane with the volcano or proximity of the virtual plane to the virtual volcano). The generated content may depend on the nature of the geometric relationship (e.g., a cross section of the virtual volcano may be generated and displayed on the virtual plane in response to intersection of the virtual plane with the virtual volcano). As noted above, this content may change temporally. Extending the above virtual volcano example, the generated content may include any of various aspects of a virtual volcanic eruption or any other content that changes over time. The change in the generated content may be in response to a particular geometric relationship (e.g., intersection) or a change in the geometric relationship (e.g., a user interacting with the virtual object, such as with the user's hand or with the stylus), in response to user input (e.g., via one or more controls on stylus 130), and/or may occur after a specified amount of time. Note that there are many other embodiments of such content generation and presentation contemplated, the examples presented herein being exemplary only. For example, a user may interact with a virtual human body by means of the virtual plane, whereby the generated content displays images, text, video, sounds, and/or other user perceptible information relevant to the virtual human body, as described above.

Figure 14:
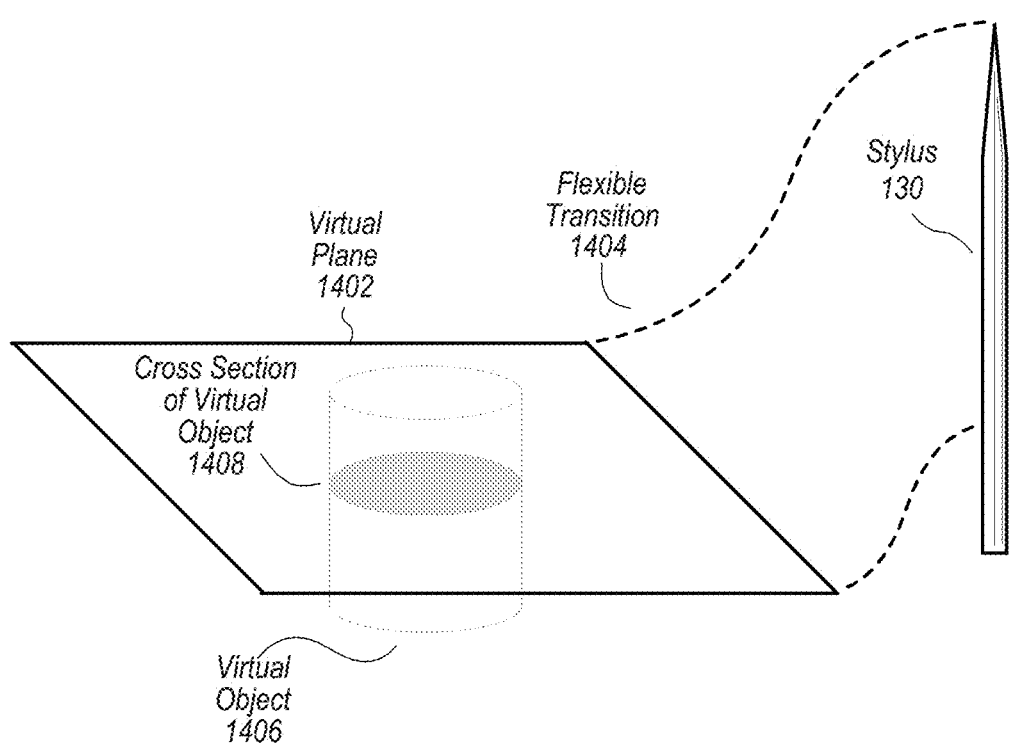
FIG. 14 illustrates an angled view of a virtual plane intersecting a virtual object according to an embodiment.

An angled view of a virtual plane intersecting a virtual object is illustrated in FIG. 14. More particularly, virtual plane 1402 is illustrated intersecting with virtual object 1406. A user may control virtual plane 1402 by means of stylus 130, which is connected to virtual plane 1402 by means of flexible transition 1404. In response to the geometric relationship of virtual plane 1402 and virtual object 1406 (intersection in FIG. 14), content may be generated. In the illustrated example, the generated content includes a cross section of virtual object 1408. Cross section 1408 may be differentiated from virtual object 1406 by any of a number of means. For example, cross section 1408 may have a different color or shade (depicted), may be textured (e.g., cross hatched or striped), or may be visually distinguished by any other means that indicates to a user that the content has been generated and is being displayed on virtual plane 1402.

It should be noted that the above-described embodiments are exemplary only, and are not intended to limit the invention to any particular form, function, or appearance. Moreover, in further embodiments, any of the above features may be used in any combinations desired. In other words, any features disclosed above with respect to one method or system may be incorporated or implemented in embodiments of any of the other methods or systems.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory computer readable memory medium that stores program instructions executable by a three dimensional (3D) stereoscopic display system to implement:
    displaying a virtual plane in a virtual 3D space on a
        display of the 3D stereoscopic display system, wherein the virtual plane is specified by a long axis of a stylus, wherein the virtual plane is displayed as extending into the virtual 3D space from the long axis of the stylus, and wherein a movement of the stylus causes a corresponding movement of the virtual plane in the virtual 3D space;

generating content in response to a geometric relationship of the virtual plane with at least one virtual object in the virtual 3D space; and presenting the content, wherein the content indicates one or more attributes of the at least one virtual object.

2. The non-transitory computer readable memory medium of claim 1, wherein said generating content comprises displaying a cross section of the virtual object defined by the virtual plane intersecting the virtual object.

3. The non-transitory computer readable memory medium of claim 1, wherein the virtual plane is displayed in accordance with a configuration, wherein the configuration specifies one or more of:
  size of the virtual plane;
  shape of the virtual plane;
  position of the virtual plane relative to the display;
  position of the virtual plane relative to the stylus; or
  appearance of the virtual plane.

4. The non-transitory computer readable memory medium of claim 3, wherein the configuration comprises one or more of:
  a default configuration;
  a configuration automatically determined based on a position of the stylus; or
  a user specified configuration.

5. The non-transitory computer readable memory medium of claim 1, wherein the content comprises imagery in the virtual plane, wherein the imagery visually indicates at least one of the one or more attributes.

6. The non-transitory computer readable memory medium of claim 5, wherein the imagery comprises at least one of:
  a thermal map;
  a virtual x-ray image;
  a contour map;
  a plot;
  a cross section;
  a video;
  structural stresses;
  fluid flow direction;
  flux magnitude;
  a cross sectional force field;
  a vector field; or
  a density map.

7. The non-transitory computer readable memory medium of claim 1, wherein the geometric relationship of the virtual plane with the at least one virtual object comprises the virtual plane being proximate to the at least one virtual object.

8. The non-transitory computer readable memory medium of claim 1, wherein the content comprises text in the virtual plane, and wherein the text indicates at least one of the one or more attributes.

9. The non-transitory computer readable memory medium of claim 8, wherein the text comprises at least one value of the at least one of the one or more attributes.

10. The non-transitory computer readable memory medium of claim 1, wherein the stylus comprises one or more controls configured to receive user input, wherein the one or more controls comprises one or more of:
  a button;
  a scroll wheel;
  a scroll ball;
  a joystick;
  a touch pad; or
  a slider.

11. The non-transitory computer readable memory medium of claim 10, wherein the program instructions are further executable by the 3D stereoscopic display system to implement:
  updating the content in response to at least one of:
    a user activating at least one of the one or more controls;
    the virtual plane moving with respect to the at least one virtual object;
    a change in at least one of the one or more attributes;
    the user interacting, via the user's hand, with the at least one virtual object; or
    the user interacting, via the stylus, with the at least one virtual object.

12. The non-transitory computer readable memory medium of claim 10, wherein the program instructions are further executable by the 3D stereoscopic display system to implement:
  changing a position of the virtual plane in the 3D virtual space in response to at least one of:
    a movement of the stylus according to one or more degrees of freedom of the stylus; or
    a user activating at least one of the one or more controls.

13. The non-transitory computer readable memory medium of claim 12, wherein the virtual plane changes position:
  at a constant speed;
  at a variable speed;
  at a constant angle with respect to the plane of the display; or
  at a variable angle with respect to the plane of the display.

14. The non-transitory computer readable memory medium of claim 10, wherein the virtual plane extends from the stylus in accordance with:
  a default extension; or
  an amount of time one of the one or more controls is activated by a user.

15. The non-transitory computer readable memory medium of claim 1, wherein an orientation of the virtual plane in the 3D virtual space is at least one of:
  parallel to the stylus;
  parallel to the display;
  perpendicular to a viewing direction of a user; or
  automatically determined by the geometric relationship of the virtual plane with the at least one virtual object.

16. The non-transitory computer readable memory medium of claim 1, wherein the virtual plane extends from the stylus fully formed, or gradually.

17. The non-transitory computer readable memory medium of claim 1, wherein the program instructions are further executable by the 3D stereoscopic display system to implement:
  fixing the virtual plane in a first position in the virtual 3D space.

18. The non-transitory computer readable memory medium of claim 17, wherein said fixing the virtual plane occurs in response to a change in an orientation of the stylus.

19. The non-transitory computer readable memory medium of claim 17, wherein the program instructions are further executable by the 3D stereoscopic display system to implement:
  periodically updating the content.

20. The non-transitory computer readable memory medium of claim 1, wherein the program instructions are further executable by the 3D stereoscopic display system to implement:
   displaying one or more additional virtual planes in the virtual 3D space on the display of the 3D stereoscopic display system, wherein each additional virtual plane specifies or presents content or at least partially defines a space.

21. The non-transitory computer readable memory medium of claim 1, wherein the program instructions are further executable by the 3D stereoscopic display system to implement:
   displaying a plurality of selectable virtual tools in the 3D virtual space, the selectable virtual tools comprising at least one of:
      at least one virtual button;
      at least one virtual knob;
      at least one virtual keyboard;
      at least one virtual slider;
      at least one picklist;
      at least one color wheel;
      at least one character map; or
      at least one virtual dial.

22. The non-transitory computer readable memory medium of claim 21, wherein display of the selectable virtual tools:
   extends from the stylus;
   is proximate to the at least one virtual object; or
   is in a specified region of the display.

23. The non-transitory computer readable memory medium of claim 21, wherein each tool of the array of selectable virtual tools is selectable via one or more of:
   a keyboard input;
   a user's hand;
   a control of the stylus;
   a user's gaze; or
   an indication by the stylus.

24. The non-transitory computer readable memory medium of claim 1, wherein the virtual plane is connected to the stylus via a flexible connection.

25. The non-transitory computer readable memory medium of claim 1, wherein the virtual plane is displayed in positive virtual 3D space.

26. The non-transitory computer readable memory medium of claim 1, wherein the program instructions are further executable by the 3D stereoscopic display system to implement:
   defining a volume in the virtual 3D space by movement of the virtual plane in the virtual 3D space.

27. A three dimensional (3D) stereoscopic display system comprising:
   at least one processor;
   one or more displays, coupled to the at least one processor;
   a stylus, communicatively coupled to the at least one processor; and
   a memory coupled to the at least one processor, wherein the memory has stored thereon instructions executable by the at least one processor to:
      display a virtual plane in a virtual 3D space on the one or more displays, wherein the virtual plane is specified by a long axis of a stylus, wherein the virtual plane is displayed as extending into the virtual 3D space from the long axis of the stylus, and wherein a movement of the stylus causes a corresponding movement of the virtual plane in the virtual 3D space;
      generate content in response to a geometric relationship of the virtual plane with at least one virtual object in the virtual 3D space; and
      present the content, wherein the content indicates one or more attributes of the at least one virtual object.

28. The 3D stereoscopic display system of claim 27, further comprising:
   a tracking system coupled to the at least one processor, wherein the tracking system tracks one or more of a user's head, a user's hand, or the stylus, and wherein the tracking system is used to determine the geometric relationship of the virtual plane with the at least one virtual object.

29. A computer implemented method comprising:
   a three dimensional (3D) stereoscopic display system performing:
      displaying a virtual plane in a virtual 3D space on a display of the 3D stereoscopic display system, wherein the virtual plane is specified by a long axis of a stylus, wherein the virtual plane is displayed as extending into the virtual 3D space from the long axis of the stylus, and wherein a movement of the stylus causes a corresponding movement of the virtual plane in the virtual 3D space;
      generating content in response to a geometric relationship of the virtual plane with at least one virtual object in the virtual 3D space; and
      presenting the content, wherein the content indicates one or more attributes of the at least one virtual object.

30. The 3D stereoscopic display system of claim 27, wherein to generate content in response to a geometric relationship of the virtual plane with at least one virtual object in the virtual 3D space, the instructions are further executable to:
   display a cross section of the virtual object defined by the virtual plane intersecting the virtual object.

* * * * *